Sept. 22, 1931. W. E. KING 1,824,157

VALVE FOR WELL CASINGS

Filed May 17, 1928

Walter E. King INVENTOR.

BY Jesse R. Stone ATTORNEYS.

Patented Sept. 22, 1931

1,824,157

UNITED STATES PATENT OFFICE

WALTER E. KING, OF HOUSTON, TEXAS, ASSIGNOR TO JAMES S. ABERCROMBIE, OF HOUSTON, TEXAS

VALVE FOR WELL CASINGS

Application filed May 17, 1928. Serial No. 278,540.

My invention relates to valves for use in closing off the passage through a well casing in case of emergency where fluid tends to flow from the well. It is particularly for use in case a well tends to blow out under the pressure of gas or where the fluid flows from the well when the well is completed.

It is a common practice to place a valve in the upper end of the casing which may be closed to shut off the passage through the casing in emergencies. The valve employed ordinarily is a gate valve having a flat gate which is adapted to be closed when emergency arises. The difficulty with the ordinary valve is that when closing to shut off the flow of gas or oil from the well, it is liable to rapid wear. The valve is hard to close under high pressures and as the valve nears its seat the flow of sand-laden fluid through the constricted passage at the valve seat tends to wear the valve to such an extent that it does not make a tight seal.

It is an object of my invention to provide a valve which is particularly adapted for making a tight closure of the passage through the casing and which cannot be easily worn so as to destroy its effectiveness during the closing of the valve.

It is also an object to provide a valve of this character which may be constructed cheaply and in which the packing employed may be easily inserted within the valve in assembling the same.

Referring to the drawings herewith, Fig. 1 is a central vertical section through a drilling valve employing my invention, the valve being shown in open position.

Figure 1:
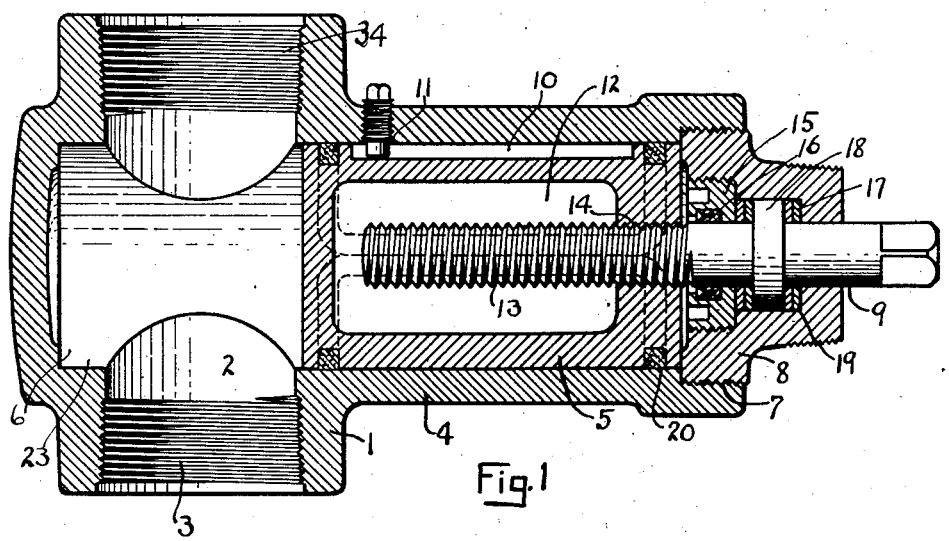

The valve shown herewith has a valve body 1 with a central passage 2 therethrough, which under normal circumstances is connected at its lower end 3 toward the upper end of the casing. The upper end is threaded at 34 for engagement with an extension of the casing, or other devices employed at the casing head. The passage 2 allows the insertion therethrough of the drill and drill stem and also furnishes an outlet for fluid flowing from the well through the casing.

Transversely of the passage 2 is a cylindrical chamber 4 adapted to receive a cylindrical piston valve 5. At one side of the passage opposite the cylinder, the wall of the passage has a cylindrical recess 6 forming a seat for the said valve.

The valve cylinder 4 is provided with a threaded socket 7 at its outer end to receive a threaded plug 8 which serves to close the outer end of the cylinder and also to form a bearing for the valve stem 9.

The piston 5 within the cylinder is cylindrical in shape, having a longitudinal groove 10 therein at one side but stopping short of each end of the piston, said groove receiving a pin 11 therein which acts as a key to prevent rotation of the valve in the cylinder. The cylinder itself is preferably hollow having a central chamber 12 to receive the threaded end 13 of the valve stem 9. The outer end of the piston has a threaded opening 14 therein to form a screw connection with the valve stem whereby the valve may be moved longitudinally of the cylinder through the rotation of said stem.

The plug 8 which closes the outer end of the cylinder has an inner stuffing box about the valve stem formed by a nut 15 screwed within the recess on the inner face of the plug and provided with a packing member 16 adjacent the valve stem. Said packing comprises a cup of flexible material having its open end toward the interior of the cylinder. Between the nut 15 and the outer end of the plug is a chamber 17 within which is housed a radial flange 18, said flange engaging with anti-friction washers 19 on each side thereto to prevent longitudinal movement of the valve stem during its rotation.

Figure 2:
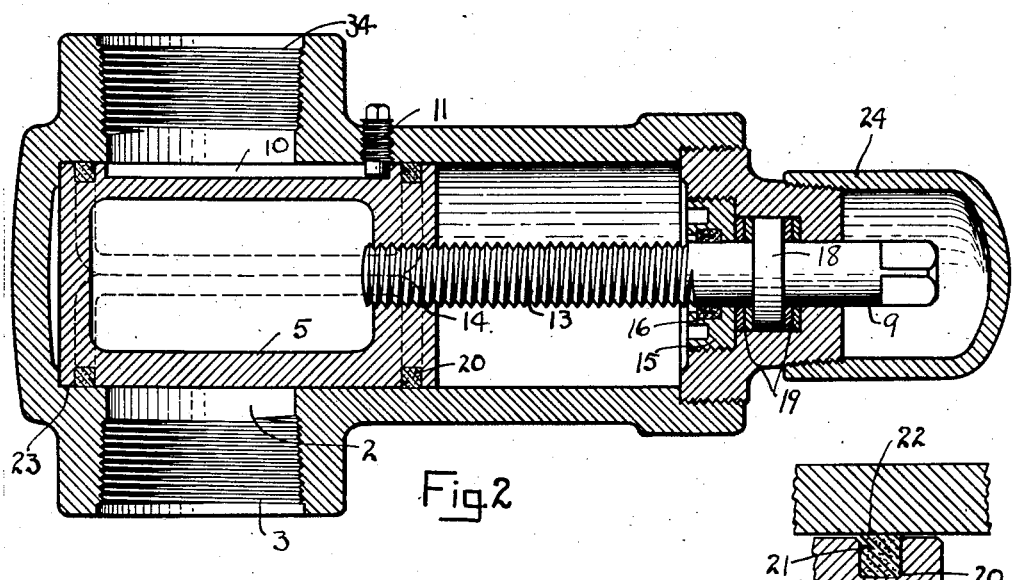
Fig. 2 is a similar view showing the valve in closed position.
Figure 4:
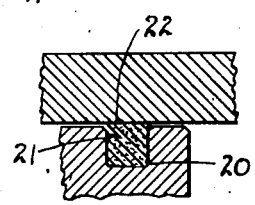
Fig. 4 is a broken section through the portion of the piston valve illustrating the construction of the packing, said packing being shown in transverse section.
Figure 3:
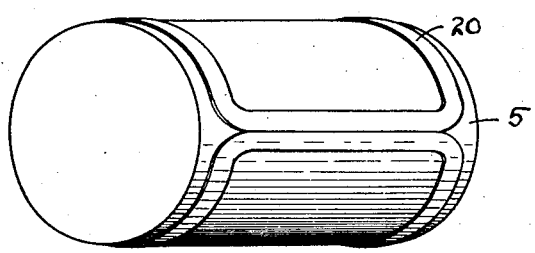
Fig. 3 is a perspective view of the valve piston removed, illustrating the mounting of the packing thereon.

The packing upon the valve is a strip of tough flexible packing material, indicated at 20 in the drawing, and as will be seen from Fig. 4, this packing is approximately rectangular in cross section and, at the outer side thereof and presented toward the direction of fluid pressure, is a groove 21 in the packing, forming an outer lip 22 against which the fluid pressure may be exerted to assist in forming a fluid tight closure between the piston and the walls of the cylinder. As will be seen particularly from Fig. 3, the packing is fitted within a groove in the cylinder, there being two strips of said packing, each an endless strip and adapted to fit within a groove which extends half way around each end of the piston and then longitudinally of the piston parallel with the axis of the same. This arrangement will be seen clearly from Fig. 3. It will be noted that the packing is spaced slightly from the forward end of the piston so that when the piston is advanced into closed position, as seen in Fig. 2, the packing will make a tight fit around the side wall 23 adjacent the valve seat 6. It will also make a close fit with the walls of the cylinder along each side of the passage 2 and around the rearward end of the piston.

When the device is used to close off the passage 2 through the drill stem under the flow of fluid, it will be noted that as the valve approaches the seat 6 the passage of the sand-laden fluid around the forward end of the piston will not wear materially upon the packing strip which is spaced slightly from the end thereof but when the valve is fitted within its seat, the packing strip will make a close contact with the wall 23 adjacent the seat and form a tight seal unaffected by the wear which may occur along the forward end of the piston. When the valve is positioned in its closed or open position, the end of the valve may be protected by means of a bull plug 24 which may be screwed upon the outer end of the plug 8, as shown in Fig. 2.

It is a material advantage of this construction that the passage 2 through the valve body is fully open and unimpeded when the piston is retracted and that the cylinder is then fully closed by the piston so that no sand or foreign material can get about the valve or operating stem. Thus the valve is freely movable at all times and will not become clogged in use.

Another advantage of this type of valve lies in the fact that it may be used under extreme conditions where high pressure tends to force the sand laden fluid through the casing and will tend to make a tight closure even though there may be some wear occurring at the forward end of the valve. The further advantages of the device will be apparent to those skilled in the art.

What I claim as new and desire to protect by Letters Patent is:

1. A valve for well casings comprising a body having a passage therethrough, a cylindrical chamber transversely of the body, said chamber providing a valve receiving recess beyond the wall of said passage, a cylindrical valve in said chamber, said valve having grooves substantially around each end and along the sides thereof, the said end grooves being spaced slightly from the ends of the valve, and packing in said grooves adapted to contact the peripheral wall of said recess.

2. A valve for well casings comprising a body, a passage through said body, a chamber in said body extending transversely across said passage and forming a valve receiving recess beyond one side of said passage, a valve in said chamber to move across said passage to seat in said recess, packings disposed about the periphery of said valve in planes short of the ends of the valve and arranged to move into said recess to seal the entire wall of said recess, and additional packing disposed on the sides of said valve whereby a continuous seal is formed about said passage.

In testimony whereof I hereunto affix my signature this 11th day of May, A. D. 1928.

WALTER E. KING.